April 15, 1969     D. L. PETERS     3,438,538

BLOW MOLDED CLOSURE

Filed June 5, 1967

INVENTOR.
D. L. PETERS

BY *Young & Quigg*

ATTORNEYS

United States Patent Office

3,438,538
Patented Apr. 15, 1969

3,438,538
BLOW MOLDED CLOSURE
Donald L. Peters, Bartlesville, Okla., assignor to Phillips Petroleum Company, a corporation of Delaware
Filed June 5, 1967, Ser. No. 643,491
Int. Cl. B65d *41/34, 25/30, 25/28*
U.S. Cl. 220—39                                                8 Claims

ABSTRACT OF THE DISCLOSURE

A blow molded hollow container closure is provided with a solid, axially depending container engaging means.

BACKGROUND OF THE INVENTION

This invention relates to a blow molded container closure. In one aspect, it relates to a blow molded container closure having a solid, axially depending container engaging means. In another aspect, the depending means are provided with threads, either internally or externally, for engagement with corresponding threads on the container to be closed.

The process of blow molding produces hollow, light weight, inexpensive articles at maximum speed and minimum cost. The art of blow molding is therefore advancing very rapidly as increasing numbers of consumer goods are made of thermoplastic materials. Containers of thermoplastic materials are in wide use today. This invention relates to the manufacture of a container closure for use with thermoplastic containers. The closure may be used with containers which are formed by injection molding, blow molding, vacuum forming, or any other common method of fabrication.

SUMMARY OF THE INVENTION

The container closure of my invention has a hollow, light weight main body portion, and is provided with a solid, axially depending skirt portion which serves to engage the container to be closed. This depending skirt portion may be provided with internal or external continuous threads, interrupted threads, lugs, or other devices which are suitable for engaging corresponding threads, depressions, or other engaging means on the container to be closed. In one embodiment, the container closure may have an additional hollow adjunct portion, such as a handle, integrally molded on.

Figure 1:
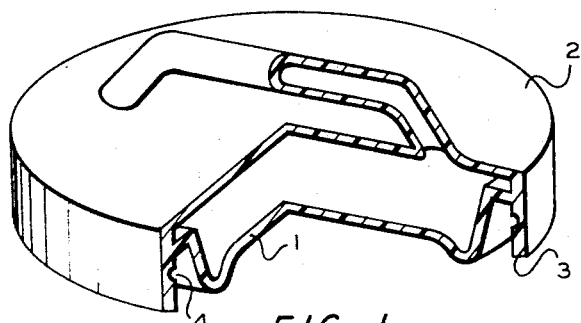
FIGURE 1 shows an isometric view of a container closure of my invention, with part of the container closure cut away to show internal structure.

As is shown in FIGURE 1, the container closure of my invention has a hollow main body portion 1, and, if desired, may have a hollow adjunct handle portion 2 which is integrally molded thereto. The closure has an axially depending, solid skirt portion 3 which engages the side walls of the container.

The embodiment shown in FIGURE 1 is a slip-on closure, in which the depending skirt portion encircles the container opening. If desired, the skirt can be provided with an annular groove 4, which serves to snap the lid onto a corresponding bead on the container. Such a groove, while not mandatory, is quite helpful in preventing accidental dislodging of the closure.

Figure 2:
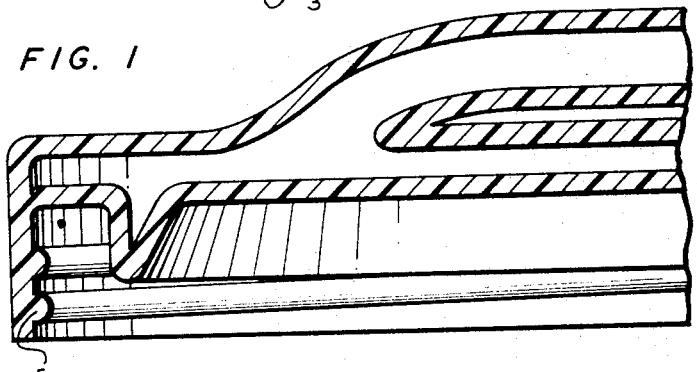
FIGURE 2 shows a cross section of a container closure of my invention having internal threads.

The depending skirt portion can be provided with other means for engagement with the container which it closes. As is shown in FIGURE 2, the skirt may be provided with internal screw threads 5. These threads will engage with corresponding external threads on the wall of the container, providing a very tight fit. This type of closure is particularly suitable for garbage pail closures, as it substantially prevents any odor from escaping from the container.

Figure 3:
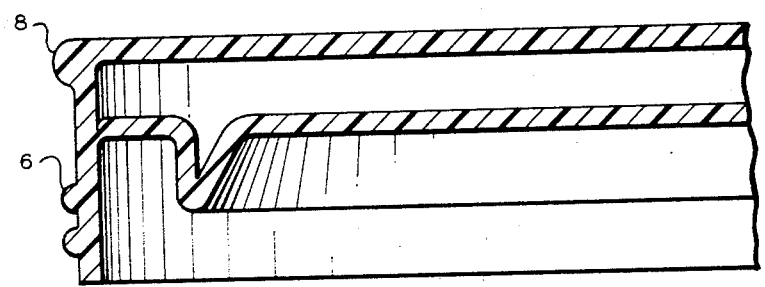
FIGURE 3 shows a container closure cross section having external threads.

A somewhat similar embodiment is shown in FIGURE 3, except that threads 6 are provided externally of the depending skirt, and in this embodiment the skirt portion of the closure will fit inside the container.

Figure 4:
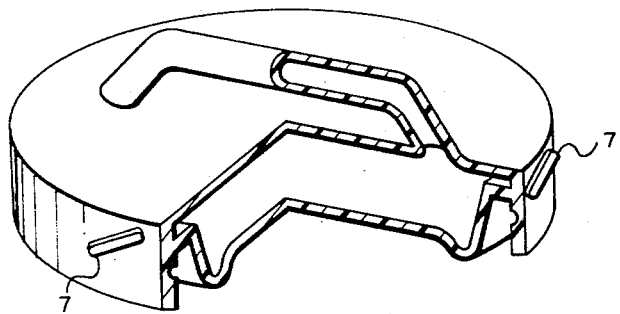
FIGURE 4 is an isometric view showing the use of interrupted threads or lugs on the skirt to provide a twist-lock type of closure.

FIGURE 4 shows a still further embodiment of my invention, which is similar to the embodiment shown in FIGURE 3, but which is provided with interrupted threads 7 or lugs for engagement with corresponding engaging means on the container to provide a convenient twist-lock type closure. While this drawing shows a closure having protruding lugs, it will be seen that the container could as easily have similarly located grooves extending to the lower edge of the skirt which would engage with protruding lugs on the internal surface of the container to be closed.

DESCRIPTION OF THE PREFERRED EMBODIMENTS

The closures of my invention are conveniently made on conventional blow molding equipment. When an integral handle adjunct portion is desired, the apparatus disclosed in application Ser. No. 452,996, filed May 4, 1965, and in application Ser. No. 17,207 by Tony E. Branscum, Bill T. Morgan and Donald L. Peters is suitable. The first of these applications discloses a mold having sliding insert parts to pinch out the area between the main body and the adjunct portions of a blow molded article, and the latter application discloses a three-part mold which is suitable for molding such articles without the use of sliding inserts.

The closures of this invention are formed in a mold having a female mold portion containing a cavity which corresponds to the upper part of the container closure. When the mold is closed, the lower male portion of the mold forms the bottom part of the closure. The clearance between the outer portions of the male member and the internal circumference of the female member of the mold is sufficiently small that the parison is mashed or compressed between these two surfaces, closing the parison walls together to form a single thickness wall.

Depending upon the embodiment to be produced, either the male or the female portions of the mold may have retractable parts for forming grooves, as, for example, would be used in the twist-lock embodiment, or they may be threaded. In FIGURE 2, for example, the male member would have a threaded side portion to form threads 5. This male portion would conveniently be rotatably mounted on its base so that the blow molded article could be screwed therefrom after cooling.

Since the container closures are made of relatively flexible material, they can generally be stripped from the mold without difficulty merely by flexing the part somewhat. Thus, a protrusion such as threads 6 or overhang 8 as shown in FIGURE 3 could easily be stripped from the female mold by mere flexing of the formed closure. In many cases, however, it will be more desirable to provide a retractable protrusion on the mold at the proper location to form an undercut, and thus remove any need for flexing the part to remove it from the mold.

While the closures of this invention can be made from any material which can be blow molded, it is generally desired that they be made of an organic thermoplastic material such as a polyolefin. Particularly preferred materials are the homopolymers and copolymers of ethylene, propylene and butene. Closures made of these materials are lightweight, inexpensive, quite durable, and may be colored in accordance with known methods in the art.

EXAMPLE

A closure of this invention was manufactured as follows:

A parison was extruded, its bottom was pinched shut, the parison was partially inflated with air, and then dropped or guided between mold sections as it continued to emerge from the die head. The handle parts of the mold were closed on one side of the parison, and the core and mold means were closed about the remainder of the parison and the article was completely formed by admitting blowing air into the parison and forcing the same against the walls of the core and mold.

A 3½-inch extruder, the twin-station model VD-3 (Producto Blow Molder), was used to make the closure of this invention. Only one station was used. The molded parts were manually unscrewed from the threaded core, but, in plant operation, a spinnable core would be installed to facilitate removal of threaded closures from the mold.

Resin used: Marlex 5603, a linear copolymer of ethylene and 1-butene with a nominal melt index of 0.3, ASTM D1238-62T. Condition "E."
Melt temperature: 365° F.
Mold temperature:
 (a) Cavity—50–60° F.
 (b) Core—130° F.

Reasonable modification and variation are permissible within the scope of the disclosure and claims without departing from the spirit of the invention.

I claim:
1. A one piece, blow molded hollow container closure comprising:
 (a) a body portion comprising two spaced walls extending substantially across the extremities of the closure and wherein each of the two walls forming the body portion terminate at the periphery of the closure, and
 (b) a solid axially depending skirt extending around the periphery of the closure and having container engaging means thereon, the engaging means on said depending skirt being adapted to interlock with engaging means on the ends of side walls of a container when said closure member is passed over the ends of said side wall means of a container.

2. A closure according to claim 1 wherein the inner spaced wall forming the main body portion of the closure is provided with a downwardly extending portion extending all around the closure, the downwardly extending portion being spaced inwardly toward the interior of the depending skirt a distance such that when said closure is passed over the ends of the side walls of a container the travel of the closure is terminated by abutment of the inner spaced wall surface of the closure against the end of the side walls of the container.

3. The closure of claim 1 wherein said depending skirt contains internal threads for engaging corresponding threads on the container walls, and further wherein the thread means are interlocked by rotating the closure in a plane substantially perpendicular to the vertical axis of the container on which the closure is placed.

4. The closure of claim 1 wherein said axially depending skirt contains external threads for engaging corresponding threads on a container, and further wherein the thread means are interlocked by rotating the closure in a plane substantially perpendicular to the vertical axis of the container on which the closure is placed.

5. The closure of claim 1 wherein said axially depending skirt contains interrupted threads as engaging means for engaging corresponding grooves on the container wall and are interlocked by rotation of the closure in a plane substantially perpendicular to the vertical axis of the container over which the closure is placed.

6. The closure of claim 1 wherein said axially depending skirt contains an annular groove as engaging means which is adapted to receive a bead on the container wall to form a snap fit when the closure member is passed over the ends of side wall means of a container.

7. A closure according to claim 1 wherein the closure is circular and has an integral hollow adjunct portion connected to the top wall of the main body section and extending above so as to form a handle gripping element.

8. The closure of claim 1 wherein the container closure is formed from a polyolefin.

References Cited

UNITED STATES PATENTS

| 3,244,272 | 4/1966 | Beaman et al. | 220—60 |
| 3,339,781 | 9/1967 | Schurman et al. | 220—9 |
| 3,361,290 | 1/1968 | Matthews et al. | 220—40 |

GEORGE T. HALL, *Primary Examiner.*

U.S. Cl. X.R.

220—94